United States Patent [19]

Dubensky et al.

[11] Patent Number: 5,215,945

[45] Date of Patent: Jun. 1, 1993

[54] HIGH HARDNESS, WEAR RESISTANT MATERIALS

[75] Inventors: Ellen M. Dubensky; Edward E. Timm; Ann M. McCombs, all of Traverse City; Julie L. Board, Midland, all of Mich.

[73] Assignee: The Dow Chemical Company, Midland, Mich.

[21] Appl. No.: 807,806

[22] Filed: Dec. 13, 1991

Related U.S. Application Data

[60] Continuation of Ser. No. 573,433, Aug. 27, 1990, abandoned, which is a continuation-in-part of Ser. No. 512,716, Apr. 23, 1990, abandoned, which is a division of Ser. No. 403,209, Sep. 1, 1989, Pat. No. 4,945,073, which is a continuation-in-part of Ser. No. 247,054, Sep. 20, 1988, abandoned.

[51] Int. Cl.$^5$ .................. C04B 35/56; C04B 35/58
[52] U.S. Cl. ......................... 501/94; 501/87; 501/96; 501/98; 501/93; 423/61; 423/62; 423/71; 423/290; 423/291; 423/297; 423/344; 423/371; 423/409; 423/411; 423/440; 423/138
[58] Field of Search ............ 501/94, 93, 87, 96, 501/98; 423/61, 62, 71, 138, 290, 291, 297, 344, 371, 409, 411, 440

[56] References Cited

U.S. PATENT DOCUMENTS

| | | | |
|---|---|---|---|
| 1,610,061 | 12/1926 | Lohmann | 501/93 |
| 2,081,049 | 5/1937 | Cooper | 501/93 |
| 2,196,009 | 4/1940 | Dawihl | 501/93 |
| 3,215,545 | 11/1965 | Reidl et al. | 501/96 |
| 3,340,076 | 9/1967 | Alper et al. | 501/93 |
| 3,433,656 | 3/1969 | Allen et al. | 501/96 |
| 3,535,132 | 10/1970 | Lunde | 501/93 |
| 3,843,375 | 10/1974 | Murata | 501/96 |
| 4,029,000 | 6/1977 | Nakamura et al. | 501/96 |
| 4,046,517 | 9/1977 | Soga | 501/93 |
| 4,049,380 | 9/1977 | Yoh et al. | 428/539.5 |
| 4,066,451 | 1/1978 | Rudy | 75/240 |
| 4,216,009 | 8/1980 | Miyake et al. | 75/0.5 AB |
| 4,257,809 | 3/1981 | Burden | 75/203 |
| 4,259,119 | 3/1981 | Watanabe et al. | 501/96 |
| 4,292,081 | 9/1981 | Watanabe et al. | 501/102 |
| 4,330,332 | 5/1982 | Schachner | 501/93 |
| 4,384,884 | 5/1983 | Miyake et al. | 75/0.5 AB |
| 4,454,105 | 6/1984 | Wada et al. | 501/93 |
| 4,927,792 | 5/1990 | Petrovic et al. | 501/92 |
| 4,945,073 | 7/1990 | Dubensky et al. | 501/93 |
| 4,970,179 | 11/1990 | Petrovic et al. | 501/92 |
| 5,030,597 | 7/1991 | Ogata et al. | 501/93 |

FOREIGN PATENT DOCUMENTS

| | | | |
|---|---|---|---|
| 257035 | 8/1963 | Australia | 501/93 |
| 53-89807 | 8/1978 | Japan | 501/93 |
| 61-36173 | 2/1986 | Japan . | |

Primary Examiner—David Brunsman

[57] ABSTRACT

A powdered admixture of a boron, carbon, nitrogen or silicon derivative of a first metal is combined with a source of a second metal and, optionally, a source of a third metal or an iron-group metal, subjected to densification conditions (heat and pressure), partially reacted and converted to a hard, wear resistant material. The wear resistant material contains an amount of the first metal derivative as well as a material of varying stoichiometry which is the partial reaction product of components of the powdered admixture The material may also contain residual, unreacted portions of components other than the first metal derivative. Articles formed from this material can be useful as, for example, nozzles in abrasive or nonabrasive waterjet cutting machines and various parts of wire drawing apparatus.

23 Claims, 3 Drawing Sheets

HIGH HARDNESS, WEAR RESISTANT MATERIALS

Cross-Reference to Related Application

This is a continuation-in-part of application Ser. No. 07/573,433, filed Aug. 27, 1990 now abandoned. which is a continuation-in-part of application Ser. No. 07/512,716 filed Apr. 23, 1990, now abandoned, which is a divisional of application Ser. No. 07/403,209 filed Sep. 1, 1989, now U.S. Pat. No. 4,945,073, which is a continuation-in-part of application Ser. No. 07/247,054 filed Sep. 20, 1988, now abandoned.

BACKGROUND OF THE INVENTION

This invention generally concerns a product prepared from an incomplete reaction of a mixture of a boron, carbon, nitrogen or silicon derivative of a first metal, a source of a second metal and, optionally, boron, carbon, nitrogen or silicon. The mixture may also include a certain amount of an iron group metal or a source of a third metal. This invention particularly concerns a material prepared from a product of an incomplete reaction between tungsten carbide (WC) as the derivative of the first metal and molybdenum sub-carbide ($Mo_2C$) as the source of the second metal. This invention further concerns wear resistant articles formed from such materials.

Tungsten carbide cemented with cobalt is a material of widely known utility for use in cutting tools and in other applications requiring high hardness. For example, tungsten carbide/cobalt is used in abrasive waterjet cutting nozzles. Unfortunately, cobalt is a strategic material. As such, its price and availability can be subject to political factors. These considerations, among others, provide a basis for many long standing programs aimed at finding replacements for tungsten carbide/cobalt.

It would be desirable to have one or more nonstrategic materials which would provide improvements in terms of hardness over tungsten carbide/cobalt, but at a lower cost than diamond. It would also be desirable to have a process which allowed production of complex, near net shapes which cannot be made by casting molten carbides or by hot pressing.

SUMMARY OF THE INVENTION

In one aspect, the present invention is a material suitable for use in fabricating articles of manufacture requiring high degrees of hardness or wear resistance. The material comprises a substantially fully dense, complex, multi-phase, fine grained product of an incomplete reaction between AX, a source of B, and, optionally, an amount of X, the reaction taking place under pressure and at an elevated temperature, said reaction product comprising at least one compound AX and at least one compound (A, B)X, a product of varying stoichiometry, wherein A and B are different materials selected from the group consisting of titanium, zirconium, hafnium, vanadium, niobium, tantalum, chromium, molybdenum and tungsten and X is selected from the group consisting of boron, carbon, silicon and nitrogen. The reaction product may also comprise a residual amount of the source of B if such is not completely consumed in forming the compound(s) (A,B)X. The reaction product, when sufficiently densified, provides the desired hardness and wear resistance.

In one related aspect, the present invention includes use of a compound BY as the source of B. Y is selected from the group consisting of boron, carbon, silicon and nitrogen, provided, however, that X and Y are not the same. The material may comprise a residual amount of BY. When using BY as the source of B, the products of varying stoichiometry include (A, B)XY, (A, B)X and (A, B)Y.

In a second related aspect, the present invention is a material comprising a substantially fully dense, complex, multi-phase, fine grained at least one product of an incomplete reaction between AX, a source of B, a source of C, and, optionally, an amount of X, the reaction taking place under pressure and at an elevated temperature, said reaction product comprising at least one compound AX and at least one compound of varying stoichiometry selected from the group consisting of (A, B, C)X, (A, B)X, (A, C)X and (B, C)X, wherein A, B and C are different materials selected from the group consisting of titanium, zirconium, hafnium, vanadium, niobium, tantalum, chromium, molybdenum and tungsten and X is selected from the group consisting of boron, carbon, silicon and nitrogen. The reaction product may also comprise a residual amount of the source of B or the source of C or both if such is not completely consumed in forming the compounds of varying stoichiometry. If one or both of the sources of B and C are not carbides, e.g., the source of B is BY, the foregoing list of compounds of varying stoichiometry must be expanded accordingly.

In a third related aspect, the present invention is a material comprising a substantially fully dense, complex, multi-phase, fine grained product of an incomplete reaction between AX, a source of B, a densification promoting amount of E, and, optionally, an amount of X, the reaction taking place under pressure and at an elevated temperature, said reaction product consisting essentially of at least one compound AX and at least one compound (A, B, E)X, a product of varying stoichiometry, wherein A and B are different materials selected from the group consisting of titanium, zirconium, hafnium, vanadium, niobium, tantalum, chromium, molybdenum and tungsten, E being an element selected from the group consisting of iron cobalt and nickel, and X is selected from the group consisting of boron, carbon, silicon and nitrogen. The reaction product desirably contains no residual E. In other words, the amount of E is desirably less than that which would leave a residual admixed with the compound (A, B, E)X. The reaction product may, however, contain an amount of the source of B if it is not completely consumed in forming the compound(s) (A, B, E)X.

In a fourth related aspect, the present invention is a method of preparing a material suitable for use in fabricating articles of manufacture requiring high degrees of hardness or wear resistance, the method comprising subjecting a powdered admixture of AX and a source of B, and, optionally, an amount of X, AX and the source of B each having a melting point, to conditions of temperature and pressure sufficient to produce a substantially fully dense, consolidated product of an incomplete reaction between AX, the source of B and, optionally, X, said product having minimal grain growth and comprising at least one compound AX and at least one compound (A, B)X, a product of varying stoichiometry, wherein A and B are different materials selected from the group consisting of titanium, zirconium, hafnium, vanadium, niobium, tantalum, chromium, molybdenum and tungsten and X is selected from the group consisting of boron, carbon, silicon and nitrogen, the temperature being less than about three fourths of the lesser of the melting points of AX and the source of B. It is believed that temperatures in excess of three fourths of the lesser melting point lead to excessive grain growth and drive the reaction toward complete reaction of the AX. These results are believed to be undesirable. The consolidated product suitably has a Vickers hardness of at least about 1900 kg/mm$^2$ measured using a 1 kg load. The Vickers hardness is beneficially at least about 2200 kg/mm$^2$. The process may further comprise one or more preliminary steps such as forming the powdered admixture of AX and a source of B, and converting the admixture into a shaped greenware article. The process may also comprise one or more finishing steps subsequent to densification.

In a fifth related aspect, the source of B used in said process is a compound BY wherein Y is selected from the group consisting of boron, carbon, silicon and nitrogen, provided, however, that X and Y are not the same. The consolidated product of the incomplete reaction between AX and BY comprises at least one compound AX and at least one compound of varying stoichiometry selected from the group consisting of (A, B)XY, (A, B)X and (A, B)Y.

In a sixth related aspect, the present invention is a method comprising subjecting a powdered admixture of AX, a source of B, a source of C, and, optionally, an amount of X, each component of said admixture having a melting point, to conditions of temperature and pressure sufficient to produce a substantially fully dense, consolidated product of an incomplete reaction among AX, the source of B, the source of C and, optionally, X, said product having minimal grain growth and comprising at least one compound AX and at least one compound of varying stoichiometry selected from the group consisting of (A, B, C)X, (A, B)X, (A, C)X and (B,C)X, wherein A, B and C are different materials selected from the group consisting of titanium, zirconium, hafnium, vanadium, niobium, tantalum, chromium, molybdenum and tungsten and X is selected from the group consisting of boron, carbon, silicon and nitrogen, the temperature being less than about three fourths of the lesser of the melting points of AX, the source of B and the source of C. As with the second related aspect, the source of B, the source of C or both may not be chemically identical, e.g., where the source of B is BX. In other words, the source of B could be BY wherein BY is as defined herein. The source of C could be CY wherein Y is as defined herein. The source of C could also be CZ wherein Z is selected from the same group as X and Y but is different from either X or Y. The foregoing list of compounds of varying stoichiometry is readily expanded where the source of B is BY or the source of C is either CY or CZ.

In a seventh related aspect, the present invention is a method comprising subjecting a powdered admixture of AX, a source of B, a densification promoting amount of E, and, optionally, an amount of X, each component of said admixture having a melting point, to conditions of temperature and pressure sufficient to produce a substantially fully dense, consolidated product of an incomplete reaction among the admixture, said product having minimal grain growth and consisting essentially of at least one compound AX and at least one compound (A, B, E)X, a product of varying stoichiometry, wherein A and B are different materials selected from the group consisting of titanium, zirconium, hafnium, vanadium, niobium, tantalum, chromium, molybdenum and tungsten, E being an element selected from the group consisting of iron, cobalt and nickel, and X is selected nitrogen, the temperature being less than about three fourths of the lesser of the melting points of AX and the source of B. The product preferably contains no unreacted E.

The term "densification promoting amount" of an element means that amount which will result in substantially complete densification of the product of an incomplete reaction between AX and a source of B at a temperature which is less than that at which said product is densified in the absence of the element with substantially no degradation of hardness and wear properties of the resultant densified product.

In an eighth related aspect, the present invention is an improved wear-resistant article formed from materials prepared by any of the foregoing process. Although SiC and B$_4$C have greater hardness than materials of the present invention wherein AX is tungsten carbide and the source of B is Mo$_2$C (See Table II), the latter materials have surprisingly improved wear resistance and performance in extreme wear applications such as nozzles, e.g., waterjet cutting nozzles or mixing tubes, abrasive blast nozzles, water blast nozzles, spray dry nozzles, paint spray nozzles and the like. The materials of the present invention are also useful in other applications such as orifices, e.g., choke valves and flow meter parts; bushings; pump and valve parts; tiles, sleeves, chutes, tubes and other parts used in handling abrasive materials such as coal or mineral slurries; cutting tools, e.g., indexable inserts, end mills, router bits, reamers, drills, saw blades, and knives used, where appropriate, for machining or cutting materials such as metals, plastics, wood products and composites: dies, capstans, rollers, guides, punches, forming tools and the like used for wire drawing, tube drawing, extrusion, molding, textile manufacturing and other operations requiring hardness or wear resistance; powder compacting dies; EDM current contacts and guides; sporting equipment; and precision parts for timepieces, computers, guns, gyroscopes and the like. This listing of suitable applications is solely for purposes of illustration and is not intended to be a definitive listing of all potential applications. Other uses should be readily apparent without undue experimentation.

DETAILED DESCRIPTION OF THE INVENTION

Figure 1:
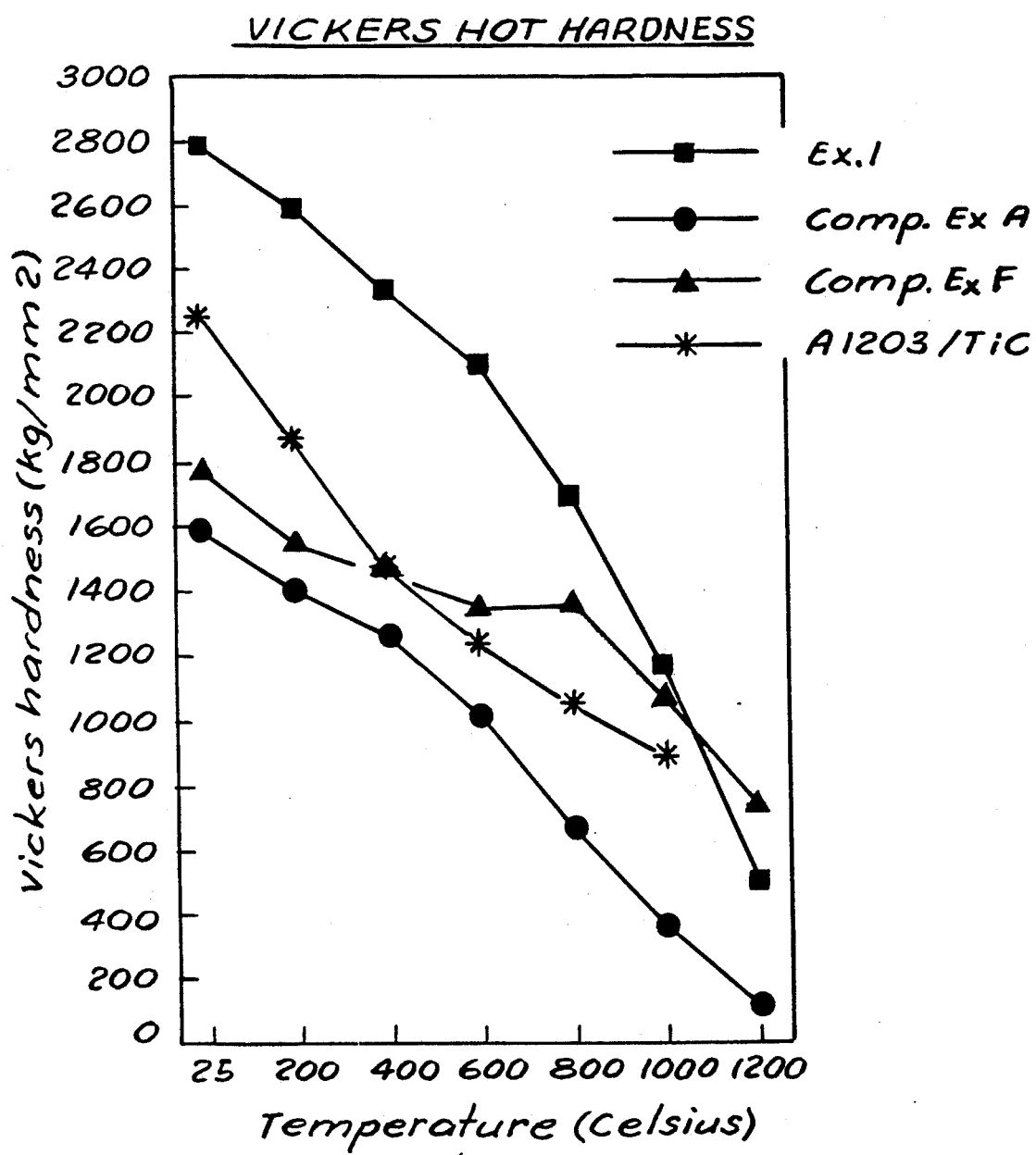
FIG. 1 is a graphic portrayal of Vickers Hot Hardness Test data for Example 1 and Comparative Examples A and F in contrast to literature values reported for an alloy of Al$_2$O$_3$ and TiC.

The present invention employs a material AX wherein A is selected from the group consisting of titanium, zirconium, hafnium, vanadium, niobium, tantalum, chromium, molybdenum and tungsten and X is selected from the group consisting of boron, carbon, silicon and nitrogen. A is beneficially tungsten, hafnium or titanium, desirably tungsten or hafnium and preferably tungsten. X is beneficially carbon, silicon or nitrogen, desirably carbon. As such, tungsten carbide is a preferred, commercially available material. The tungsten carbide has an average grain size which is suitably about ten microns or less, beneficially about five microns or less, desirably about one micron or less and preferably from about 0.4 to about 0.8 microns. The grain size is desirably as fine as possible. Such a size is not always commercially available. As such, the commercially available powders may have to be used as is or, if possible, reduced in size by attrition or another suitable process. Acceptable grain sizes for other materials of the formula AX approximate those for tungsten carbide and are readily determined without undue experimentation. The material AX is preferably in powder or particulate form.

In one aspect of the present invention, the presence of an iron group metal, designated herein as "E", is a necessary component of at least a portion of the incomplete reaction product. In other words, the incomplete reaction product has varying stoichiometry and is generically represented by formula (A, B, E)X. E is an element selected from the group consisting of iron, cobalt and nickel. E is preferably cobalt. A densification promoting amount of E provides satisfactory results. The amount must be sufficiently high to promote substantially complete densification of the product of the incomplete reaction. It also must be sufficiently low to substantially preclude its presence as an unreacted material in the densified product. Densification beneficially occurs at a temperature lower than that needed in the absence of E, e.g., 100° C. or more lower. In addition, such densification desirably accompanies maintenance of hardness and wear properties equivalent to those obtained at said higher temperature. It is desirably low enough to minimize, preferably eliminate, use of E as a binder metal, e.g., in the sense of a traditional cobalt bound tungsten carbide hard metal. The amount is suitably from about 0.01 to about 2.0 percent by weight based upon the combined weight of A, B and X.

In other aspects of the present invention, addition of one or more auxiliary or binding metals, such as those of the iron group, e.g., cobalt, while permissible provided they do not adversely affect physical properties of resultant compositions, is believed to be unnecessary. Although cobalt is not an essential component, inadvertent addition of trace amounts is believed to be unavoidable if milling or attritor media used to form powdered mixtures contain an amount of cobalt. Cobalt, in particular, aids in forming mixed carbides which may lower densification temperatures to about 1400° C. or lower, depending upon the composition. However, cobalt is not believed to be essential for complete densification. One need only use higher temperatures in the absence of cobalt to approach or achieve complete densification.

The present invention also employs a source of B. B, like A, is selected from the group consisting of titanium, zirconium, hafnium, vanadium, niobium, tantalum, chromium, molybdenum and tungsten. B is not, however, the same as A. In other words, when A is tungsten, B may be any of the aforementioned materials other than tungsten. Certain aspects of the present invention favor choices of B which differ from those of other aspects. When the reactants are AX and a source of B, or AX, a source of B and E, B is beneficially molybdenum, vanadium, zirconium, chromium, and, when A is not tungsten, tungsten. B is desirably molybdenum or chromium, and preferably molybdenum. When the source of B is BY, B is desirably titanium. When the reactants are AX, a source of B, a source of C and, optionally, an amount of X, the source of B is beneficially chromium carbide or titanium carbide. The source of B is preferably in powder or particulate form.

The source of B includes the aforementioned metals as well as the boron, carbon, silicon and nitrogen derivatives thereof. Other than the aspect wherein the source of B is BY, derivatives of B, where used, are desirably chemically consistent with AX. That is, if X is carbon, the source of B is desirably a carbide or subcarbide of B. By way of illustration, sources of molybdenum include molybdenum metal, molybdenum carbide (MoC), and molybdenum subcarbide ($Mo_2C$). If B is an elemental powder, such as molybdenum metal, one may, if so desired, add an amount of X, carbon in this instance, which is desirably less than or equal to that amount needed to equate stoichiometrically with other sources of molybdenum such as MoC and Mo2C. Addition of more than a stoichiometric equivalent, while possible, may leave residual unreacted X, carbon in this instance, which, in turn, may adversely affect physical properties, e.g., Vickers Hardness, of resultant densified materials.

A preferred source of molybdenum is the subcarbide $Mo_2C$. $Mo_2C$ is believed to serve as a source of both molybdenum and carbon for preparation of the mixed carbides. A suitable, but less preferred, source of molybdenum is molybdenum metal. Another suitable, but even less preferred, source of molybdenum is molybdenum carbide (MoC). Combinations of two or more sources of molybdenum also provide satisfactory results. The molybdenum source is preferably in powder or particulate form.

The source of B is beneficially employed in an amount sufficient to allow the formation of at least one compound of varying stoichiometry. Depending upon components of the incomplete reaction, the compound will be (A, B)X, (A, B)Y, (A, B)XY, (A, B, E)X, (A, B, E)Y, (A, C)X, (B, C)X or (A, B, C)X, wherein A, B, C, E, X and Y are as defined herein. The amount is desirably sufficient to form said compound(s) without providing such a large residuum that physical properties or performance of the reaction product are degraded enough to cause the reaction product to have no practical utility. The amount is also desirably less than that which would fully react all of AX. Such amounts vary depending upon the source of B, but are readily determined without undue experimentation.

By way of illustration, the source of B, when B is molybdenum, is beneficially employed in an amount sufficient to allow the formation of at least one tungsten-molybdenum mixed carbide. The molybdenum source is desirably employed in an amount sufficient to provide the final composition with a molybdenum content of about one weight percent or more. When the molybdenum source is $Mo_2C$, the amount is suitably from about one to about thirty, desirably from about three to about 20, and preferably from about six to about ten, percent by weight, based upon the weight of the total amount of $Mo_2C$ and WC starting materials.

When the source of B is BY, Y differs from X, but is selected from the same group as X. By way of illustration, when X is carbon and Y is nitrogen the incomplete reaction product may be a carbonitride, e.g. (W, Mo)CN.

The present invention, in certain aspects, also includes a source of C. C is selected from the same group of elements as A and B provided, however, that A, B and C are all different elements. Like B, the source of C may be an elemental material or a boron, carbon, silicon or nitrogen derivative thereof. For some applications, the source of C is desirably chemically consistent with AX and the source of B. In other words, X is carbon and the sources of B and C are both metal carbides For other applications, the source of C need not be consistent with AX, the source of B or both. As such, the source of C may be CY or CZ depending upon whether it is to differ chemically only from AX or both AX and BY. The source of C is also desirably in the form of a powder. It is employed in an amount of sufficient to form at least one compound (A, B, C)X without an excessively large residue of unreacted material. In other words, some residual source of C may be present without substantially reducing desirable properties of resultant materials. Other compounds, such as (A, B)X, (A, C)X and (B, C)X, may be formed concurrently with formation of the compound (A, B, C)X. An amount is considered excessively large if it degrades physical properties such as hardness to a point where the resultant material has no practical utility.

The process of the present invention suitably comprises subjecting a powdered admixture of reactants to densification conditions sufficient to produce a consolidated product of an incomplete reaction between or among the reactants. The product comprises at least one compound AX and at least one compound of varying stoichiometry. The latter compound is generically represented as (A, B)X, (A, B)Y, (A, B)XY, (A, B, E)X, (A, C)X, (B, C)X or (A, B, C)X depending upon selection of components for said powdered admixture. The variables A, B, C, E, X and Y are as defined herein. Incorporation of Z by way of CZ expands the list of compounds of varying stoichiometry to include compounds such as (A, B, C)XY and (A, B, C)XYZ. The densification conditions are selected to minimize grain growth and include a temperature which is less than about three fourths of the lesser of the melting points of AX and the remaining components of the admixture other than E, but greater than a temperature at which no appreciable consolidation occurs. The temperature may exceed the melting point of E where an iron group metal such as cobalt is present. A temperature in excess of the melting point of E is not, however, always necessary or even desirable. The conditions also include a pressure sufficient to achieve a desirable degree of densification. The reaction product is preferably substantially fully dense.

As used herein, the terms "incomplete reaction", "incomplete reaction product" and "product(s) of an incomplete reaction" all refer to the reaction of AX with the other components of the powdered admixture wherein at least a portion of AX does not react with said other components. As a consequence, that portion is admixed with the incomplete reaction product(s) (compound(s) of varying stoichiometry) and, optionally, a small amount of the other components in products prepared in accordance with various aspects of the present invention.

When A is tungsten, B is molybdenum and X is carbon, the densification conditions are beneficially sufficient to produce a material having a Vickers hardness, measured using a 1 kg load, of at least about 2200 $kg/mm^2$. The Vickers hardness is desirably more than about 2300 $kg/mm^2$ and preferably more than about 2400 $kg/mm^2$. Lower Vickers hardness values, e.g., about 1900 $kg/mm^2$ or less, are readily attainable if the material is to be used in applications wherein the higher hardness values are not needed. One means of attaining such lower values is to select molybdenum metal as the molybdenum source.

Figure 2:
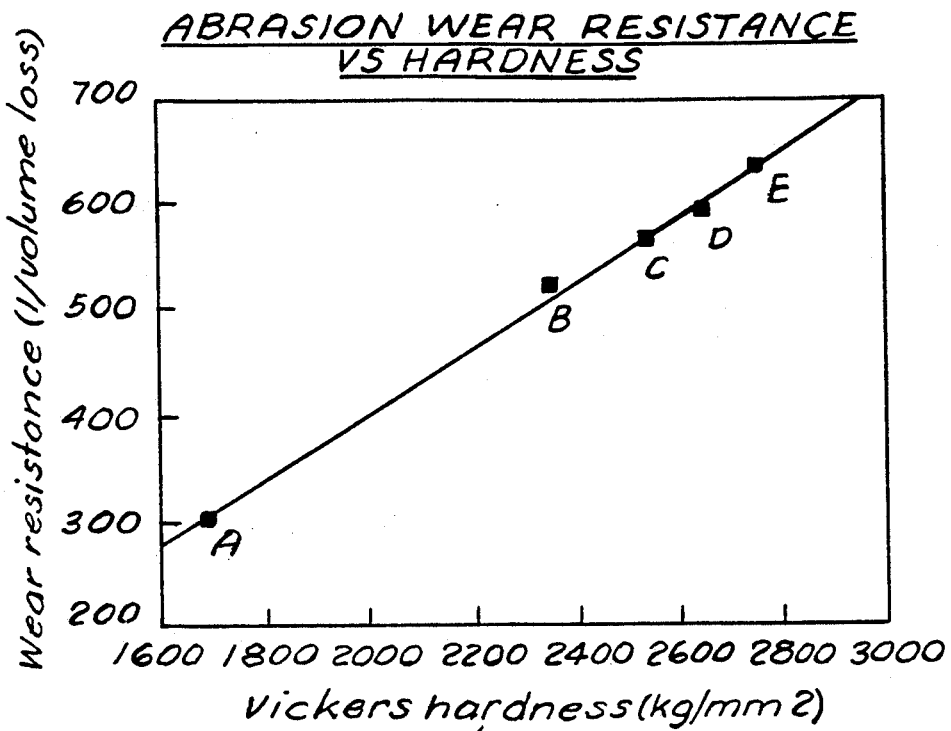
FIG. 2 is a graphic portrayal of the relationship between Vickers Hardness and wear resistance for the densified materials of Examples 1 and 8-13 wherein A is tungsten, B is molybdenum and X is carbon. The starting Mo$_2$C content, based upon weight of starting powder, for each of the points is as follows: A=50 wt-%; B=20 wt-%; C=12 wt-%; D=6 wt-%; and E =1 wt-%.

When elements other than tungsten, molybdenum and carbon are substituted, respectively, for A, B and X, or when the source of B is BY or when one or more of reactants E and C are employed, the resultant densified materials can provide Vickers hardness values as low as about 1000 $kg/mm^2$. FIG. 2 shows a generally linear relationship between Vickers hardness and wear resistance for the tungsten/molybdenum/carbon densified materials. Analogous densified materials, obtained from the aforementioned substitutions, should behave similarly. As such, the wear resistance of a 1000 $kg/mm^2$ Vickers hardness material should be much lower than that of a 2400 $kg/mm^2$ Vickers hardness material. Because of chemical compatibility or other reasons, the lower hardness materials may, however, still show exceptional utility in certain applications.

The powdered admixture may be prepared by any one of a number of conventional mixing processes so long as a generally uniform admixture is obtained and no adverse effects upon physical properties of the resultant material are observed. The use of an attritor, wherein balls of hard material are used to facilitate mixing, provides particularly satisfactory results even if small portions of the balls, typically formed from a tungsten carbide/cobalt material, are abraded therefrom during mixing and added to the admixture. The presence of a minor amount of cobalt in reaction products or final materials does not adversely affect the physical properties of the densified material. The use of balls formed from the same material as that being mixed, e.g., tungsten carbide/molybdenum carbide balls where A is tungsten, B is molybdenum and X is carbon, reduce the inadvertent addition of cobalt. If E is included as a reactant, the amount of cobalt added via abrasion of the attritor or mulling media may, if desired, result in reduction of the amount of E added as an element.

The starting materials, AX, the source of B, the source of C, E and, optionally an amount of X, are beneficially in particulate or powder form before they are converted to an admixture. It is believed that small particles offer more advantages than large particles, at least in terms of hardness, wear and residual unreacted starting materials. Small particles, as a general rule, also require less mixing time than large particles. As such, the powders desirably have an average particle size of less than about 2 microns. Based upon factors such as availability, larger particle sizes may have to be used as received or, if necessary, subjected to size reduction operations before use.

Mixing of the powders in an attritor is beneficially accomplished with the aid of a liquid such as heptane. In order to facilitate greenware formation subsequent to mixing, a binder such as paraffin wax can be added during the final stages of attrition. Desirably, the attrited mixture is dried before further processing. Particularly satisfactory results are obtained by screening or classifying the attrited and dried mixture to remove unwanted agglomerates and fines.

The process of the present invention may also comprise a second preliminary step wherein the attrited, dried and classified mixture is converted to a preform. Preforms can be prepared using technology known in the powder metals or ceramics industries. See, e.g., U.S. Pat. No. 4,446,100; and *Modern Ceramic Engineering*, Chapter 6, pages 178-215 (1982), the teachings of which are incorporated herein by reference.

A typical procedure for converting a particulate material, which can contain reinforcements, fillers, densification aids, binders, lubricants, dispersants, flocculants, etc., into a preform begins by forming or shaping the powder into a desired configuration using uniaxial pressing, isostatic pressing, slip casting, extrusion, injection molding or any similar technology. The resulting article is then prepared for densification by thermal or chemical debindering, pre-sintering, green machining, re-isopressing, and the like. A protective coating can be applied to the resulting article to prevent reaction with the environment. In extreme cases, the article can be "canned", or placed in an impervious container, to permit handling without atmospheric contamination. The resulting article, as prepared for densification, is referred to herein as "greenware".

When B is molybdenum, densification is suitably conducted at a temperature of less than about 1600° C. Temperatures in excess of 1600° C., e.g., about 1650° C., offer no appreciable advantages in terms of an increase in density. Such temperatures do, however, provide a significant disadvantage in that they promote grain growth which is believed to adversely affect performance of the densified material in practical considerations like hardness. Temperatures which are too low to achieve adequate densification are unacceptable. It is believed that adequate densification cannot be achieved much below about one-half the melting temperature of the molybdenum source. Of the three preferred molybdenum sources, molybdenum metal, $Mo_2C$ and MoC, molybdenum metal has the lowest melting point at 2617° C. As such, a reasonable lower temperature limit for densification is about 1300° C. In the absence of a densification aid such as an iron group metal, densification at temperatures as low as 1300° C. requires optimum conditions. Such conditions include very fine and well-mixed powders. The range of temperatures for densification is desirably from about 1350° C. to about 1500° C. Temperature ranges for other combinations of AX and B are readily determined without undue experimentation.

Addition of the densification promoting amount of E allows substantially complete densification of the materials of the present inventions at a temperature which is lower than that at which equivalent densification occurs in the absence of E. As the amount of E increases and approaches its upper limit of incorporation into the product (A, B, E)X, the temperature for densification decreases. Conversely, as the amount of E decreases and approaches a level at which it no longer affects densification of the material incorporating (A, B, E)X, the temperature needed for substantially complete densification increases and approaches that needed for materials having no E. The densification promoting amount does not adversely affect of the resultant compound's physical properties, e.g., hardness and wear.

The actual temperature needed for densification and the effect of E vary with choices for A, B, E and X. By way of illustration composites wherein AX is tungsten carbide and the source of B is $Mo_2C$ can be consolidated to near theoretical density at temperatures as low as 1400° C. in the absence of E and at lower temperatures with an appropriate amount of E. Substituting $Cr_3C_2$ for $Mo_2C$ increases the temperature for consolidation to theoretical density to temperatures in excess of 1500° C. Use of the densification promoting amount of E lowers the consolidation temperature to 1400° C. or even lower and avoids pitfalls such as excessive grain growth.

The greenware is subjected to pressure assisted densification using one of several techniques known to those skilled in the art whereby the greenware is desirably subjected to pressure at elevated temperatures to produce a desired article. These techniques include hot pressing, hot isostatic pressing (HIP'ing) and rapid omnidirectional compaction (ROC). Although any of these techniques may be used with varying degrees of success, particularly suitable results are obtained by the ROC technique which employs mechanically induced pressure, e.g., that generated by using a forging press, as a means of densifying greenware.

A desirable method of converting the greenware into a satisfactory densified article is described in U.S. Pat. No. 4,744,943, the teachings of which are incorporated herein by reference. When such a method is employed, the pressure is suitably applied for a period of time of less than about one hour. The period of time is preferably less than about thirty minutes, desirably less than about one minute and preferably less than about 30 seconds. In order to facilitate recovery of resultant densified parts, the greenware is beneficially wrapped in graphite foil or some other substantially inert material prior to being placed in a glass pocket fluid die or other densification medium.

U.S. Pat. No. 4,081,272 discloses a glass-encapsulated HIP process. U.S. Pat. No. 3,622,313 discloses a HIP process. The teachings of these patents are incorporated herein by reference. If the glass-encapsulated process is used, a desirable modification includes evacuating the glass capsule containing a part to be densified and eliminating the use of powdered glass. Application of pressure suitably occurs over a period of one hour or less.

The densified article prepared in the manner described hereinabove is a complex, multi-phase, fine-grained composite containing, as principal components, at least one compound of varying stoichiometry and at least one compound AX. The compound of varying stoichiometry will have a composition which reflects the choice of reactants. In other words, it will be represented as (A, B)X where the reactants are AX and a source of B; as (A, B, E)X, (A, B)X or both where the reactants are AX, a source of B and E: as (A, B)XY, (A, B)X, (A, B)Y or mixtures thereof where the reactants are AX and BY; and as (A, B, C)X, (A, B)X, (A, C)X, (B, C)X or mixtures thereof where the reactants are AX and sources of B and C. If the reactants are AX, BX and CY or AX, BY and CZ, the compounds of varying stoichiometry will be represented by variations of the foregoing. By way of illustration, when A is tungsten, B is molybdenum and X is carbon, the reaction product will contain tungsten carbide and at least one mixed carbide of tungsten and molybdenum (W, Mo)C. If the source of B and, where appropriate, E or the source of C, are not fully converted to the compound of varying stoichiometry, the reaction product will also contain an amount of the source of B, e.g., Mo$_2$C, and, where appropriate, the source of C. The amount may vary from as little as a trace amount, e.g., about 0.01 percent by weight or less, to much larger quantities depending upon a variety of interrelated variables. Such variables include starting material selection, adequacy of mixing, and densification parameters. Finally, if an attritor is used for mixing and the balls contained therein are formed at least partially from a material other than the starting materials, e.g., cobalt, that material may be incorporated into the composite as, for example, part of an additional mixed carbide phase.

The densified article exhibits surprisingly improved hardness and wear resistance in comparison to a like article formed from tungsten carbide/cobalt. The Vickers hardness of an article representative of the present invention, e.g., that produced when A is tungsten, B is molybdenum and X is carbon, is suitably at least about 2200 kg/mm$^2$ measured using a 1 kg load. The Vickers hardness is beneficially at least about 2300 kg/mm$^2$, and desirably at least about 2400 kg/mm$^2$. As noted hereinabove, lower Vickers hardness values on the order of 1900 kg/mm$^2$ or even lower may be acceptable for some applications. Also as noted hereinabove, those hardness values are readily attainable with the process of the present invention. The article wherein A in tungsten, B is molybdenum and X is carbon suitably exhibits an abrasion wear resistance of at least about 500 cm$^{-3}$ measured by the ASTM G65-80 method. The abrasion wear resistance is desirably at least about 550 cm$^{-3}$. The article beneficially exhibits an erosion wear rate of no more than about $3 \times 10^{-3}$ mm$^3$/g of abrasive measured at a 30 degree angle measured by the ASTM G76-83 method. The article desirably exhibits an erosion wear rate of no more than about $2 \times 10^{-3}$ mm$^3$/g of abrasive measured at a 90 degree angle measured by the ASTM G76-83 method. Although lower wear rates would clearly be desirable, measurement of such rates with currently available equipment is quite difficult, if not impossible. Skilled artisans will recognize that hardness and wear resistance vary depending upon the materials represented by A, B, X and where appropriate, C, E and Y. Skilled artisans will recognize that wear resistance is proportional to hardness and that softer materials may provide an abrasion wear resistance below 500 cm$^{-3}$. These materials may be suitable in extreme temperatures or in chemically aggressive environments.

The densified article suitably has a fine-grained structure with an average grain size of less than about ten microns. The grain size is beneficially less than about five microns and desirably less than about one micron.

The articles of this invention generally have a density of about 85 percent of theoretical density or greater. The density is beneficially more than about 90 percent, desirably more than about 95 percent and preferably about 100 percent of theoretical density. "Theoretical density", as used herein, is a calculated value based upon volume fraction and density of the starting components. "High density", as used herein, refers to a density of at least about 90 percent of theoretical density. Another measure of adequate densification is porosity of the articles of this invention. The porosity is suitably minimized to attain optimum hardness. As such, the porosity is beneficially less than about 5 percent by volume, based upon total article volume. The porosity is desirably less than about 3 percent by volume and preferably less than about 1 percent by volume. As used herein, the term "substantially fully dense" means either a density of 99 percent or more of theoretical density or a porosity of less than about 1 percent by volume. The material of the invention is particularly useful for the fabrication of cutting tools and nozzles, such as waterjet cutting nozzles.

Specific Embodiments of the Invention

The following examples and comparative experiments illustrate the present invention and should not be construed, by implication or otherwise, as limiting its scope. All parts and percentages are by weight and all temperatures are in ° centigrade (° C) unless otherwise indicated. Examples of the present invention are designated by Arabic numerals whereas comparative examples are identified by capital letters.

Example 1—Preparation of Densified Material using Mo$_2$C as the Molybdenum Source The starting powder is a mixture of 94 percent tungsten carbide powder having an average particle size of 0.8 micron, and 6 percent Mo$_2$C having an average particle size of about four microns. The powder mixture is intensely mixed, in the presence of heptane, in an attritor containing fifty kilograms of tungsten carbide-cobalt balls for 8 hours. About 2–3 percent paraffin wax is added as a binder during the last thirty minutes of attritor mixing. The resultant mixture is dried and screened through a 20 mesh screen. Greenware parts are made by cold-pressing the mixture which passes through the screen in steel tooling at 5,000 pounds per square inch (psi) (35 MPa). The cold-pressed parts are then cold isostatically pressed at 30,000 psi (210 MPa). The resultant parts are dewaxed under vacuum at 350° C. The greenware is then placed into a glass pocket fluid die, or isostatic die assembly, preheated at 1400° C. for 2 hours in a nitrogen atmosphere, and then isostatically pressed at 120,000 psi (830 MPa) for 5 seconds. The pressing procedure is described in more detail in U.S. Pat. Nos. 4,744,943; 4,428,906; and 4,656,002, the teachings of which are incorporated herein by reference. The fluid die is cooled in air and the parts are recovered and sand blasted.

Analytical work involves the use of metallography, light microscopy, analytical scanning electron microscopy (ASEM), electron probe analysis (EPA), analytical transmission electron microscopy (ATEM), and x-ray diffraction (XRD). Microstructures are observed under the SEM, ATEM, and light microscopes. Determination of the presence of a reaction phase makes use of XRD. Composition of the reaction phase is determined by EPA and ATEM. Volume fraction of phases is determined by stereology of BSE images, and grain counting in ATEM.

Analysis of the composite indicates a bulk composition of 88.3 percent by weight W, 5.6 percent Mo, and 6.1 percent C. The material is a discrete, multi-phase composite including about 28.5 percent by volume WC, about 70 percent by volume of a mixed tungsten-molybdenum carbide (MoC-WC containing 3–32 mole percent MoC and 0.2 weight percent Co), about 1.3 percent by volume of a mixed cobalt-tungsten-molybdenum carbide having a cobalt content of 2–10 weight percent, about 0.01 percent by volume Mo$_2$C, and about 0.2 percent by volume voids. The material is fully granular with no binder phase or continuous phase. The material also displays no discernible grain separation. The mixed tungsten-molybdenum carbide phase is a continuum of compositions in the range of 1.5–19 weight percent Mo, or 3-32 mole percent MoC in the mixed carbide. The average composition of the mixed carbide phase is 7.2 weight percent Mo or 13.7 mole percent MoC in the mixed carbide phase.

Grain size distribution is determined using the intercept method described by Underwood in *Quantitative Stereology*, Addison-Wesley, Reading, Mass. (1970). The average grain size is about 0.22 microns, with 80% of the grains having a size of less than 0.3 microns. The final WC grain size is about 0.25 μm. The physical properties of the parts are summarized in Table I.

TABLE I

Physical Properties of Articles Prepared in Ex. 1

| Property | Measured Value | Method |
|---|---|---|
| Density | 14.9 g/cm$^3$ | Water immersion ASTM B311-58 |
| Hardness | 2650 kg/mm$^2$ | Vickers-1 kg ASTM E384-73 |
| Palmqvist Toughness (W) | 25 kg/mm | Palmqvist indentation |
| Strength | 950 MPa | Transverse rupture strength ASTM B406-76 |
| Wear Rate | | |
| A. Abrasion | 693 1/cm$^3$ | ASTM G65-80 |
| B. Erosion | 0.9 × 10$^{-3}$ mm$^3$/g (30°) 0.7 × 10$^{-3}$ mm$^3$/g (90°) | ASTM G76-83 |

The data presented in Table I show that the composite exhibits outstanding hardness and wear resistance. Similar results are expected with other compositions of the present invention.

Example 2—Preparation of Densified Material using Metallic Molybdenum as the Molybdenum Source The process of Example 1 is repeated except that the Mo$_2$C starting powder is replaced with 11.3 percent Mo. Analytical data indicates the final composite is 72 percent WC, 25 percent of a mixed (W, Mo)C phase, and 3 percent Mo$_2$C, with the primary binding phase having the following composition: 61 percent W, 33 percent Mo, 6 percent C. The Vickers 1 kg hardness of the composite is 1925 kg/mm$^2$.

Example 3—Duplication of Example 2 With a Lower Molybdenum Metal Content

The process of Example 2 is repeated except that 6.8 percent Mo is employed. Analytical data indicates that the final composite has a composition similar to that of Example 1. The Vickers 1 kg hardness of the composite is 2570 kg/mm$^2$. Results similar to those shown in Examples 1-3 are attainable with other components and process conditions, all of which are disclosed herein.

Comparative Experiments

The tungsten carbide/cobalt material of Comparative Example A is formed into a greenware part and densified in a manner similar to that of Example 1. Comparative Examples B-E and G are densified by sintering and Comparative Examples F, H and I are densified by hot pressing. The latter procedures are well known in the art. The materials of Comparative Examples A-I and the materials produced in Examples 1 and 3 are then tested for wear rate as measured by abrasion and erosion. The ASTM G65-80 dry sand rubber wheel test is used to measure abrasion, while erosion is measured according to the procedure of ASTM G76-83. Abrasion wear is recorded as the inverse of the volume loss. Erosion data is reported as volume loss/gram of abrasive. The results of these tests, as well as the Vickers hardness for the materials, is reported in Table II.

TABLE II

Properties of WC-Mo and WC-Mo$_2$C Composites Compared to Other Hard Materials

| Example/ Comparative Example | Material | Vickers Hardness kg/mm$^2$ | Wear Number (Abrasion) 1/cm$^3$ | Erosion (×10$^{-3}$ mm$^3$/g) 30° | Erosion (×10$^{-3}$ mm$^3$/g) 90° |
|---|---|---|---|---|---|
| 3 | WC-6.8 Mo | 2570 | 700 | 2.1 | 1.0 |
| 1 | WC-6.0 Mo$_2$C | 2650 | 693 | 0.9 | 0.7 |
| A | WC-6.0 Co WC/Low Co | 1800 | 440 | 21.4 | 8.7 |
| B | K-602* (1.5) | — | 275 | 5.8 | 4.8 |
| C | K-11* (2.8) | — | — | 4.8 | 4.3 |
| D | K-8* (3.8) | — | — | 6.4 | 3.7 |
| E | Al$_2$O$_3$ | 2000 | — | 30.4 | 39.5 |
| F | Si$_3$N$_4$ | 1550 | — | 15.0 | 25.5 |
| G | SiC | 2800 | 150 | — | 18.0 |
| H | B$_4$C | 3100 | 139 | 1.6 | 1.2 |
| I | TiB$_2$ | — | 129 | — | — |

*Commercially available from Kennametal Inc. The numbers in parentheses indicate weight percent of binder material.
— Not measured.

As can be seen from Table II, the tungsten carbide/molybdenum-containing materials of the present invention have surprisingly high hardness and wear-resistance in comparison to tungsten carbide/cobalt and other hard materials.

Vickers Hot Hardness Testing

The materials of Example 1 and Comparative Examples A and F are subjected to Vickers Hot Hardness testing in accordance with the procedure described by B. North in *Engineering Applications of Brittle Materials*, page 159 (1985), the teachings of which are incorporated herein by reference. Results of the testing, with a one kilogram load and a ten second indent time at various temperatures, are graphically displayed in the Figure. The Figure also displays literature values reported for an alloy of Al$_2$O$_3$ and TiC. The data shown in the Figure indicates the suitability of compositions of the present invention for high temperature applications such as cutting tools for metals. Similar results are obtained with other materials and process conditions, all of which are disclosed herein.

Examples 4–7—Variation of Tungsten Carbide Starting Material Grain Size

The procedure of Example 1 is replicated save for increasing the tungsten carbide starting material average grain size in Examples 5, 6 and 7 respectively to 1.6 microns, 3.5 microns and ten microns and increasing the load for the Vickers Hardness test from one kilogram to 13.6 kilograms. Vickers Hardness test results, in kg/mm$^2$, are as follows: Example 4—2480; Example 5—2320; Example 6—2100; and Example 7—1925. The Vickers Hardness test data shows that starting material grain size affects at least the hardness of the resultant material. Similar results are expected with other materials and process conditions, all of which are disclosed herein.

Example 8 and Comparative Example J—Comparison of Densified Materials Prepared by Sintering (Comparative Example J) and by the Process of the Invention The starting powder for each process is a mixture of 99 percent of the same tungsten carbide powder as used in Example 1 and one percent of a Mo$_2$C powder having an average particle size of two microns.

The powder mixture of Comparative Example J is mixed in a ball mill, in the presence of heptane, for a period of 24 hours. About one percent of paraffin wax is added during the last thirty minutes of milling. Greenware parts are formed and dewaxed as in Example 1. The parts are then heated in an argon atmosphere at a temperature of 2225° C. for a period of thirty minutes to accomplish densification by sintering. The parts have a very coarse grain structure, a density of about 96 percent of theoretical density and a Vickers hardness of about 1100 kg/mm$^2$.

The powder mixture of Example 8 is converted to densified parts by the procedure of Example 1. The parts have a very fine grain structure, a density of about 98 percent of theoretical density and a Vickers hardness of about 2750 kg/mm$^2$.

A simple comparison of the foregoing results demonstrates that the processes provide substantially different results from the same starting materials and that the process of the present invention produces a much harder material. Similar results are obtained with other materials and process parameters which are representative of the present invention.

Examples 9-13 and Comparative Examples K-L—Effect of Composition upon Resultant Physical Properties Using varying amounts of the tungsten carbide powder of Example 1 and the Mo2C powder of Example 8, a number of densified parts are prepared by following, with two exceptions, the procedure of Example 1. In one exception, 100% Mo$_2$C powder is processed by the procedure of Example 1 except for omission of attritor mixing. In the second exception, greenware parts for Comparative Examples K and L are wrapped in graphite foil, e.g., that commercially available from Union Carbide under the trade designation Grafoil ®, to facilitate part recovery. The densified parts are subjected to the following physical property tests: (a) Vickers Hardness (VHN), with a one kilogram load, in terms of kg/mm$^2$; (b) Palmqvist Toughness (W), with a 13.6 kilogram load, in terms of kg/mm; (c) Wear Number (WN), per ASTM G-65-80, in terms of 1/cm$^3$; and (d) Volume Losses (VL) at 30° and 90°, per ASTM G-76-83, in terms of 10$^{-3}$ mm$^3$/gm. The Palmqvist Toughness test is described by R. Warren and H. Matzke in "Indentation Testing of a Broad Range of Cemented Carbides", *Science of Hard Materials*, pages 563–82, R. K. Viswanadham, D. J. Rowcliffe and J. Gurland eds., Plenum Press (1983). Physical property data obtained from these tests is summarized in Table III which follows:

TABLE III

| Example/Comparative Example | Physical Property Test Results | | | | |
|---|---|---|---|---|---|
| | % | | | Wear Test Data | |
| | | | | | VL |
| | Mo$_2$C | VH | W | WN | 30° | 90° |
| 9 | 1 | 2750 | 24.7 | 632 | 0.03 | 0.10 |
| 10 | 3 | 2740 | 23.9 | — | — | — |
| 11 | 6 | 2650 | 24.9 | 600 | 0.09 | 0.05 |
| 12 | 12.6 | 2540 | 24.6 | 564 | 0.35 | 0.08 |
| 13 | 19.8 | 2350 | 24.2 | 521 | 0.14 | 0.09 |
| K | 30 | 2176 | 21.8 | 369 | 0.06 | 0.02 |
| L | 40 | 2107 | 20.8 | 408 | 0.11 | 0.04 |
| M | 50 | 1690 | 19.5 | 299 | 4.1 | 2.60 |
| N | 100 | 1400 | — | — | — | — |

— not measured

Figure 3:
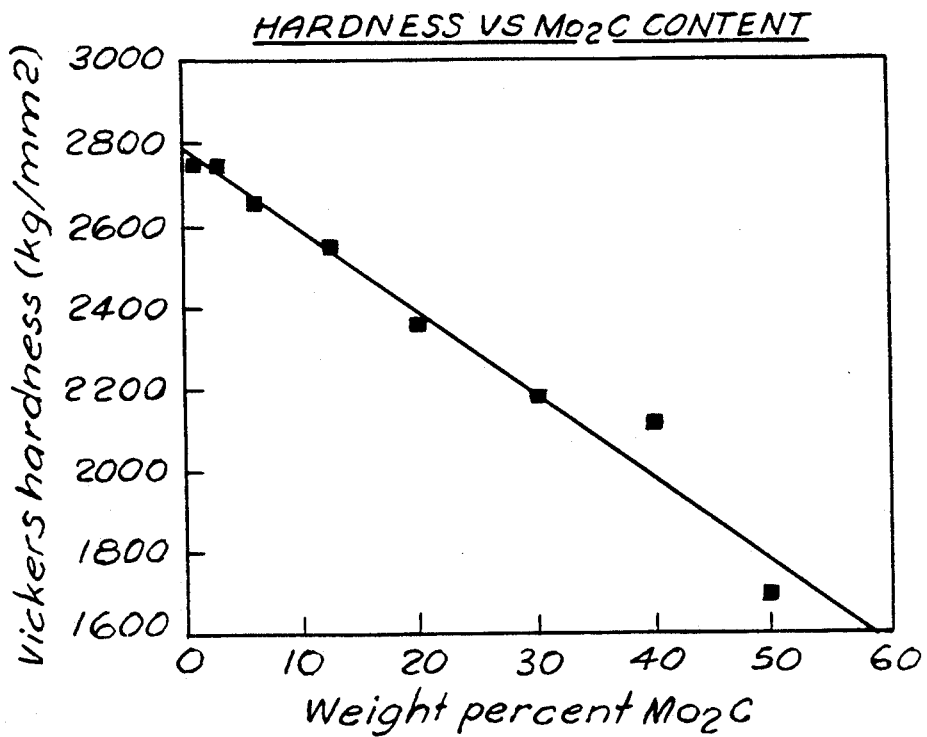
FIG. 3 is a graphic portrayal of the relationship between Vickers Hardness and starting Mo$_2$C content for the densified materials of Examples 9-13 and Comparative Examples K-N.

The data presented in Table III, and graphically portrayed in FIG. 3, demonstrate the suitability of the process of the present invention for preparing hard, wear-resistant materials from a variety of compositions. Densified materials prepared from starting compositions wherein the amount of Mo$_2$C is fifty weight percent or more are clearly softer and less wear resistant than materials wherein the amount of Mo$_2$C is twenty weight percent or less. Although not shown in Table III, acceptable performance may be achieved with an Mo$_2$C content of less than thirty weight percent. Similar results are obtained with other starting materials and process parameters, all of which are presented herein.

Example 14—Waterjet Cutting

The procedure of Example 1 is repeated to prepare abrasive waterjet nozzles having a length of two inches and a bore of 0.062 inch. The nozzle bore is formed by machining the article prepared from the consolidated or densified powders. The resulting nozzles are tested against commercially available tungsten carbide/cobalt nozzles according to the following procedure.

The nozzles are installed on a commercially available abrasive jet cutting machine available from Flow Systems, Inc. (Model No. 11x Dual). For a description of an example of a waterjet cutting machine, see U.S. Pat. No. 4,648,215. The water pressure is 35,000 psi and the abrasive flow rate is 1.5 pounds/minute. The jewel size is 0.018 inch. The nozzle wear rate is determined by measuring the increase in exit bore size as a function of time. The results are summarized in Table IV.

TABLE IV

| Composition | Abrasive | Time (Min.) | Increase in Exit Bore Size, Inches | Wear Mil/Min. |
|---|---|---|---|---|
| WC/Co | Al$_2$O$_3$ | 1 | +0.015 | 15 |
| WC/Mo$_2$C | Al$_2$O$_3$ | 42 | +0.012 | 0.29 |
| WC/Co | Garnet | 45 | +0.012 | 0.27 |
| WC/Mo$_2$C | Garnet | 435 | +0.002 | 0.0023 |

As can be seen from Table IV, the material of the present invention wears surprisingly slower than the commercial material using alumina or garnet as the abrasive. The commercial WC/Co material wears so rapidly with the alumina abrasive that it is not economically viable in such an application. Similar results are expected with other compositions and process conditions of the present invention.

In a second series of tests, the procedure is identical except that the machine is a Model 9x Dual, the water pressure is 30,000 psi (208 MPa) and wear rate is measured by the increase in nozzle entrance bore size as a function of time. The test is continued until it is observed that nozzle wear is extensive enough to cause the water/abrasive jet stream to spread and noticeably interfere with the quality of the cut on the work piece or until sufficient time had elapsed to demonstrate the viability of a nozzle. The results are summarized in Table V.

TABLE V

| Composition | Abrasive | Time (Min.) | Increase in Entry Bore Size, In. | Wear Mil/Min. |
|---|---|---|---|---|
| WC/Co | Garnet | 100 | +0.020 | 0.20 |
| WC/Mo$_2$C | Garnet | 720 | +0.010 | 0.014 |

Surprisingly, the test indicates that the material of the present invention provides a nozzle which lasts over 14 times longer than the present commercially available tungsten carbide/cobalt nozzle. Similar results are expected with other starting materials and process conditions of the present invention.

Example 15 and Comparative Examples O-P—Effect of Pressure Cycle Upon Resultant Physical Properties The process of Example 1 is replicated with the following exceptions: (a) the starting powders and wax are processed in a commercial attritor as is typical for commercial scale production of WC/Co powders; (b) greenware parts are cold-pressed at about 10,000 psi (70 MPa), rather than 5,000 psi (35 MPa) as before; (c) the isostatic pressure is varied between 15-30 tons per square inch (tsi) (208-415 MPa) maximum pressure (as shown in Table VI); (d) isostatic press dwell time is increased to 15 or 30 seconds, also as shown in Table VI: and (e) the greenware is wrapped in graphite foil, commercially available from Union Carbide under the trade designation Grafoil®, prior to being in placed into the glass pocket fluid die. Recovered parts are subjected to density and hardness measurements as in Example 1. The data obtained from such measurements is presented in Table VI.

TABLE VI

Physical Properties of Example 15 and Comparative Examples O-P

| Example/ Comparative Example | Maximum Pressure (tsi) | Dwell (sec) | Density (g/cm$^3$) | VHN (kg/mm$^2$) |
|---|---|---|---|---|
| O | 15 | 10 | 12.7 | 1220 |
| P | 30 | 10 | 13.7 | 1793 |
| 15 | 15 | 30 | 14.7 | 2601 |

A simple comparison of the foregoing results demonstrates that at low pressures and low dwell times (Comparative Examples O and P), the articles are clearly of lower density and hardness than those produced in Example 1. However, with low pressure and a longer dwell time (Example 15), a material with properties approximating those of Example 1 may be obtained.

Examples 16-20 and Comparative Example Q—Effect of Preheat Temperature upon Resultant Physical Properties The process of Example 1 is replicated except for the temperature to which the parts are preheated just prior to pressure application(the time of preheat, two hours, is not changed). This temperature is varied from 1250° to 1500° C. in 50° C. increments. In addition, the graphite foil wrap of Example 15 is used for the greenware. Physical property measurements for density and Vickers hardness are made in accordance with the test descriptions accompanying Example 1. Palmqvist toughness (W) is measured by Palmqvist Indentation. The measurements and preheat temperature are found in Table VII.

TABLE VII

Physical Properties of Example 16-20 and Comparative Example Q

| Example/ Comparative Example | Preheat T (°C.) | Density (g/cm$^3$) | VHN (kg/mm$^2$) | W (kg/mm) |
|---|---|---|---|---|
| Q | 1250 | 14.6 | 2446 | 23.8 |
| 16 | 1300 | 14.9 | 2612 | 24.4 |
| 17 | 1350 | 14.9 | 2545 | 24.0 |
| 18 | 1400 | 15.0 | 2726 | 23.9 |
| 19 | 1450 | 15.0 | 2675 | 24.4 |
| 20 | 1500 | 15.0 | 2551 | 24.2 |

By comparison with the data from Example 1, It can be seen that in order to produce similar material, the preheat temperature is suitably above 1300° C. If a material of lower hardness an be tolerated, a lower preheat temperature may be used.

Comparative Example R—Consolidation of the Material by Application of Temperature without Pressure The process of Example 15 is repeated except that the parts are cold-pressed using a dry bag isopress with 0.609 inch diameter tooling, with 30,000 pounds per square inch (208 MPa) pressure and a dwell time of 10 seconds. They are then dewaxed and loaded into fluid dies as in Example 1, and preheated at 1400° C. for two hours. The preheated parts are removed from the furnace without application of pressure and allowed to cool. The parts are recovered as in Example 1. ATEM (Analytical Transmission Electron Microscopy) shows evidence of some reaction between WC and Mo$_2$C, but to a much lesser extent than observed in Example 1 wherein the preheated parts are subjected to isostatic pressure of 120,000 psi (830 MPa) for 5 seconds after removal from the furnace.

Analysis of the parts using the analytical techniques of Example 1 indicates a bulk composition of about 62 percent by volume WC, about 28 percent by volume of a mixed tungsten-molybdenum carbide similar to that found in Example 1 (reaction product 1), about 2.5 volume percent of a high-Mo mixed tungsten-molybdenum carbide (reaction product II), about 1.5 volume percent unreacted Mo$_2$C, and about 6 volume percent voids. Reaction product I contains an average of about 6.8 weight percent Mo, with the range extending from about 1.8 to 17.9 weight percent Mo. Reaction product II is MoC/-WC product of varying stoichiometry with an average of 48 weight percent Mo, ranging from 27 to 72 weight percent Mo.

Comparative Example R contains considerably more unreacted WC than the material of Example 1 (62 percent vs. 28.5 percent). In turn, it also contains less of the mixed carbide reaction product A, with only 28 percent as compared to 70 percent in Example 1. Example R also contains reaction product B, a partially reacted molybdenum carbide, which Example 1 does not have, and about 1.5 weight percent unreacted Mo$_2$C compared to 0.01 percent in Example 1. These observations suggest that pressure is necessary to achieve an acceptable reaction between the two carbides, at least at a preheat temperature of 1400° C. The current example also contains more voids than the first, due to poor densification.

The parts have a much higher porosity than those of Example 1, 6 volume percent voids versus 0.2 volume percent voids. The high porosity precludes an accurate density measurement. The Vickers 1 kg hardness is 573 kg/mm$^2$, considerably lower than the 2650 kg/mm$^2$ of Example 1. These differences indicate that parts prepared without sufficient application of pressure are unsuitable for applications requiring high hardness. Because of the relationship between hardness and wear resistance, these parts are also believed to be unsuitable for applications requiring substantial wear resistance.

Example 21—Preparation of Densified Material by Hot Isostatic Pressing

Figure 4:
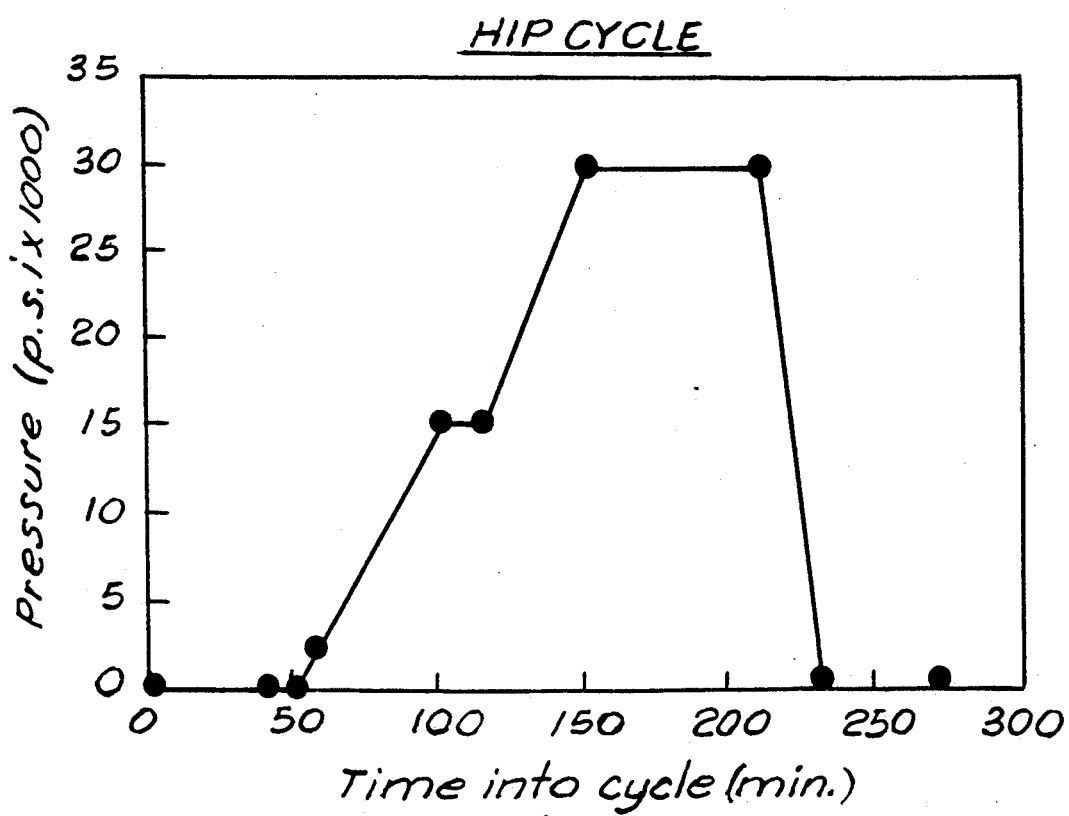
FIG. 4 is a graphic portrayal of the hot isostatic press cycle of Example 21 in terms of time versus pressure.

The process of Example 15 is repeated through the step involving cold isostatically pressing of the greenware at 30,000 psi. The resultant parts are dewaxed under vacuum at 350° C. and subsequently presintered at 1400° C. in order to reduce the possibility of outgassing during hot isostatic pressing (HIP). The greenware is then placed in a Pyrex ampule, which is evacuated and sealed. The encapsulated part is placed in a HIP unit, and subjected to a gradual increase in pressure (see FIG. 4 for a graphic portrayal of cycle) up to 30,000 psi (208 MPa). The temperature is concurrently increased to 1400° C. The pressure of 30,000 psi (208 MPa) and the temperature of 1400° C. are maintained for one hour. Pressure and temperature are then gradually decreased and the part removed upon completion of the cycle. The part, following recovery from the ampule, is subjected to physical property testing as in Example 1. The physical properties are as follows: Density—14.8 g/cm$^3$; Vickers hardness—2598 kg/mm$^2$; and Palmqvist Toughness (W)—22.5 kg/mm. These properties compare favorably with those of Example 1 and suggest that Hot Isostatic Pressing is a viable alternate procedure to that described in Example 1.

Example 22—Preparation of Densified Material Incorporating an Amount of X

The process of Example 15 is replicated except that the starting powders are changed to provide a mixture of 94 percent WC, 5.6 percent Mo, and 0.4 percent carbon black. The resultant densified material has a Vickers 1 kg hardness measurement of 2460 kg/mm$^2$. This hardness measurement suggests that substitution of an amount of X for a like amount of the source of B does not substantially reduce physical properties of the resultant densified material. It also suggests that the densified material should be useful for wear resistant applications.

Comparative Example 5—Preparation of Densified Material using a Mixture of Elemental Powders The process of Example 22 is replicated except that the starting powders are changed, and a smaller attritor is used (3.5 kg load of WC/Co balls). The starting powders are 88.2 percent W, 5.6 percent Mo, and 6.2 percent carbon black. The resultant densified material has a Vickers 1 kg hardness measurement of 725 kg/mm$^2$. This hardness measurement suggests that mixtures of elemental powders do not provide satisfactory densified materials. It also suggests poor wear characteristics. Similar results are attainable with other mixtures of elemental powders.

Example 23—Preparation of Densified Material using Chromium Carbide as the Source of B The process of Example 1 is, with certain exceptions, repeated using a chromium carbide rather than Mo$_2$C as a source of B. The exceptions are: (a) use of the attritor of Comparative Example S: (b) cold pressing at 10,000 psi (70 MPa) rather than 5,000 psi (35 MPa): (c) greenware is wrapped in graphite foil as in Example 15; and (d) a preheat temperature of 1500° C. rather than 1400° C. The starting powder is a mixture of 95.5 percent of the same tungsten carbide powder as in Example 1 and 4.5 percent chromium carbide powder having an average particle size of −325 mesh (less than about 48 microns).

Analysis of the composite indicates about 3.3 volume percent unreacted Cr$_3$C$_2$, about 0.8 volume percent chromium-tungsten carbide associated with the unreacted chromium carbide, about 11 volume percent chromium-tungsten carbide in WC/WC interstices, about 0.1 volume percent voids, and about 85 volume percent unreacted WC. The composition range of the reaction product appears to be fairly narrow, based on EPA analysis: about 75 weight percent Cr, about 12 weight percent W, and about 12 weight percent C. Associated with the reaction product is about 0.4 weight percent V, which is present in the WC starting powder at a level of about 0.15 weight percent.

By observation using ATEM and use of the intercept method, average grain size of the unreacted WC is about 0.2 microns. Average grain size of the unreacted Cr$_3$C$_2$ is about 0.3-5 microns.

Physical properties of recovered parts are summarized in Table VIII. The test methods are described in Example 1.

TABLE VIII

| Physical Properties and Wear Data of Example 23 | |
|---|---|
| Property | Measured Value |
| Density | 14.3 g/cm$^3$ |
| Vickers Hardness, VHN | 2428 kg/mm$^2$ |
| Palmqvist Toughness, W | 21.2 kg/mm |
| Wear Number, WN | 520 1/cm$^3$ |

Due to the high hardness and wear resistance of this material, it can be expected that it wold perform well in application similar to those for WC/Mo$_2$C, with the potential added feature of improved oxidation resistance at higher temperature due to the presence of Cr$_3$C$_2$.

Examples 24-26—Effect of Composition of Tungsten Carbide-Chromium Carbide upon Resultant Physical Properties The process of Example 23 is replicated except that the weight percent of Cr$_3$C$_2$ in the powder mixture, and the preheat schedule, are changed. The preheat schedule used for the following parts involves a ramp from room temperature to 1500° C. at 10° C./min, followed by a 15 minute hold at temperature prior to pressure application. Three different compositions are used: 6, 10, and 20 weight percent Cr$_3$C$_2$. Table IX summarizes certain physical property test results for each composition.

TABLE IX
Physical Properties of Examples 24–26

| Example | Weight % $Cr_3C_2$ | Vickers Hardness, VHN (kg/mm$^2$) | Palmqvist Toughness W (kg/mm) |
|---------|---------------------|-----------------------------------|-------------------------------|
| 24      | 6                   | 2354                              | 18.9                          |
| 25      | 10                  | 2500                              | 21.4                          |
| 26      | 20                  | 2502                              | 21.6                          |

From this data, it appears that good material can be obtained from a wide range of compositions. Examples 25 and 26 would in particular be expected to demonstrate high wear resistance, by comparison with the hardness and wear data on Example 23, and by analogy from the Abrasion Resistance vs. Hardness curve of FIG. 2. Similar results are expected with other compositions disclosed herein.

Example 27—Preparation of Densified Material using Titanium Carbide as the source of AX, and Vanadium Carbide as the Source of B The procedure of Example 23, save for a change in the preheat cycle, is repeated sing titanium carbide rather than tungsten carbide as a source of AX and vanadium carbide rather than $CrC_2$ as a source of B. The starting powder is a mixture of 88.4 weight percent titanium carbide having an average particle size of 3.8 microns and 11.6 weight percent vanadium carbide having an average particle size of 5.6 microns. Preheat temperature prior to pressure application changed to a cycle of 2 hours at 600° C., 2 hours at 1400° C., and 2 hours at 1650° C.

Analysis of the microstructure by the techniques of Example 1 indicates about 91 volume percent mixed titanium-vanadium-tungsten carbide with small quantities of titanium carbide, 8.1 volume percent voids, and 1.0 volume percent impurity carbide. No unreacted vanadium carbide is detected using ASEM, EPA, ATEM, or XRD. EPA results indicate a fairly limited composition range for the mixed carbide reaction product: about 67 weight percent Ti, about 20 weight percent C, about 10 weight percent V, about 3 weight percent W, and about 0.2 weight percent Si. W is found, by Proton-Induced X-ray Emission, in the powder mix at 3 weight percent but not in the original powders prior to mixing. As such, the source of W may be impurities in the attritor or the WC/Co attritor media.

Physical properties of recovered parts are summarized in Table X. The test methods are described in Example 1.

TABLE X
Physical Properties of Example 27

| Property              | Measured Value          |
|-----------------------|-------------------------|
| Density               | 4.7 g/cm$^3$            |
| Hardness, VHN         | 1137 kg/mm$^2$          |
| Palmqvist Toughness, W| 15.5 kg/mm              |

The hardness and wear resistance are expected to improve as the void volume decreases. Process optimization, perhaps through an increase in preheat temperature, a reduction in starting powder grain size, or more intense milling, is expected to provide a reduction in void volume.

Example 28—Preparation of Densified Material Using Tungsten Disilicide as the Source of AX and Molybdenum Disilicide as the Source of B The procedure of Example 23 is repeated with a different mixture of starting powders and a preheat temperature of 1400° C. instead of 1500° C. The starting powders are 93.1 percent $WSi_2$ with an average particle size of 6.1 microns and 6.9 percent $MoSi2$ with an average particle size of 4.2 microns.

Analysis of recovered material reveals a microstructure containing about 51 volume percent $WSi_2$, about 16 volume percent of a first reaction product with about 3 percent molybdenum, about 8 volume percent of a second reaction product with about 56 percent molybdenum, about 18 volume percent silica, about 6 volume percent WC with low Co, less than one volume percent voids, and about one volume percent miscellaneous impurities. Based upon EPA and ATEM, the first reaction product consists of about 72 percent tungsten, 23 percent silicon and 3 percent molybdenum. Unreacted molybdenum disilicide is not detected by ASEM, EPA or ATEM. The miscellaneous impurities and silica can be accounted for by considering impurity pickup from the attritor or attritor media, and reaction of the part with glass from the fluid die pocket in which it is heated and pressurized.

The recovered material has a density of 8.8 g/cm$^3$ and a Vickers Hardness of 1395 kg/mm$^2$. It is expected that physical properties of the material can be improved by reducing the amount of $SiO_2$ in the sample. One possible means of doing so is to process these materials in an oxygen-free environment. Other means are known to skilled artisans.

Example 29—Preparation of Densified Material using Titanium Nitride as the Source of AX and Zirconium Nitride as the Source of B The procedure of Example 23 is repeated, except (for the preheat schedule, with a different mixture of starting powders. The powders are 86.9 percent TiN with an average particle size of 1.6 microns and 13.1 percent ZrN with an average particle size of 8.2 microns. The alternate preheat schedule involves a 10 degree per minute ramp from room temperature to 1800° C., followed by a 15 minute hold at temperature.

Microstructure of the sample is analyzed by the methods of Example 1. There is an extensive reaction between the TiN and the ZrN, yielding a titanium-zirconium nitride which comprises about 85.6 volume percent of the sample. Unreacted TiN is present at about 2.0 volume percent, and there is a trace amount of unreacted ZrN (<0.1 volume percent). The remainder of the sample consists of about 4.7 volume percent $ZrO_2$, about 1.0 volume percent tungsten silicide (with a low Fe content), and about 6.6 volume percent voids. The tungsten silicide contaminant is presumed to come from the attritor/media. The composition of the titanium-zirconium-nitride reaction phase is about 70.9 weight percent titanium, about 6.9 weight percent zirconium, and about 22.2 weight percent nitrogen.

Physical property measurements taken on recovered samples are listed in Table XI.

TABLE XI
Physical Properties of Example 29

| Property | Measured Value |
|----------|----------------|
| Density  | 5.2 g/cm$^3$   |

TABLE XI-continued

| Physical Properties of Example 29 | |
|---|---|
| Property | Measured Value |
| Hardness, VHN | 1152 kg/mm$^2$ |
| Palmqvist Toughness W | 14.9 kg/mm |

The hardness of this material suggests that it should not have a level of wear resistance as high as that of the material prepared in Example 1. This material is useful for applications where lower hardness or wear resistance or both are acceptable.

Examples 30-32—Preparation of Densified Material using Hafnium Carbide as the Source of AX and Tungsten as the Source of B The procedure of Example 23, save for a change in the preheat schedule, is replicated with different mixtures of starting powders. The starting powders are hafnium carbide with an average particle size of 2.1 microns, and tungsten metal with an average particle size of about one micron. The ratio of HfC:W are either 85:15 or 70:30. The preheat schedule involves a ramp from room temperature at 10° C./minute to the desired preheat temperature of 1650° C. or 1800° C. The samples are then held at temperature for fifteen minutes prior to pressure application.

Physical property measurements are presented in Table XII together with the relevant preheat temperature and weight percent tungsten metal powder.

TABLE XII

| Physical Properties of Examples 30-32 | | | | | |
|---|---|---|---|---|---|
| Example | Wt-% Tungsten | Preheat Temp. °C. | Density (g/cm$^3$) | Hardness VHN (kg/mm$^2$) | Palmqvist Toughness (W) (kg/mm) |
| 30 | 15 | 1650 | 12.5 | 1992 | 15.8 |
| 31 | 15 | 1800 | 11.9 | 1718 | 19.1 |
| 32 | 30 | 1650 | 12.6 | 2132 | 18.4 |

By observation of the samples under a scanning electron microscope, and the use of an electron dispersive spectrometer, it appears that in all three examples there is a reaction between the HfC and the W, as grains of different proportions of Hf:W can be found.

Example 32 demonstrates an improvement in hardness and toughness over Example 30, with an increase in the percentage of tungsten metal. Example 31 shows no improvement in properties with an increase in preheat temperature. The material of Example 32 shows promise for cutting tool and wear-resistant applications due to its high hardness. Similar results are expected with other compositions disclosed herein.

Example 33—Preparation of Densified material Using Tungsten Carbide as AX and Titanium Nitride as BY The process of Example 23 is, with certain exceptions, duplicated for a mixture of 96.4 percent of the same tungsten carbide as in Example 1 and 3.6 percent titanium nitride having an average particle size of about 1.5 micron. The mixture is attrited for four hours with a 7 kilogram load of tungsten carbide-cobalt (WC-Co) balls and converted in cylindrical samples weighing 25 grams and having a diameter of 1.85 cm and a length of 1.19cm using the procedures of Example 1. The samples are then wrapped in graphite foil, as in Example 23, preheated to 1650° C. at a rate of 10° C./minute, held at that temperature for 15 minutes and then consolidated, as in Example 1, at a pressure of 827 MPa for 10 seconds Physical properties of recovered parts are as follows: a) density—14.54 g/cm$^3$ (99.7 percent of theoretical); b) Hardness, Rockwell A—95.6; c) Vickers hardness—2602 kg/mm$^2$, and d) Palmqvist toughness—23.9 kg/mm. The recovered parts have a hot hardness, measured as in Example 1, of 10.74 GPa at 1200° C.

Examples 34-36—Preparation of Densified material Using Tungsten Carbide as AX and Titanium Nitride as BY The process of Example 33 is, save for using the attritor of Example 23, increasing the preheat temperature to 1800° C. and the time at pressure to 30 seconds and varying the pressure and time at pressure as shown in Table XIII, replicated for Examples 34-36. The density, Hardness, Rockwell A, Porosity (ASTM B-276-79) and Vickers hardness are also shown in Table XIII.

TABLE XIII

| Physical Properties of Examples 34-36 | | | | | |
|---|---|---|---|---|---|
| Example No. | Pressure (MPa) | Density (g/cc) | Density % Theoretical | Hardness Rockwell A | Vickers Hardness (kg/mm$^2$) | Porosity |
| 34 | 828 | 14.66 | 100.6 | 95.1 | 2450 | A04 |
| 35 | 414 | 14.69 | 100.8 | 95.0 | 2374 | A04 |
| 36 | 207 | 14.69 | 100.8 | 94.9 | 2393 | A06, B04 |

Examples 37-38—Preparation of Densified Material Using Tungsten Carbide as AX and Tantalum Nitride as BY The process of Example 33 is, save for using the attritor of Example 23, changing the composition to a mixture of 89.6 percent of the same tungsten carbide as in Example 1 and 10.4 percent tantalum nitride and varying the preheat temperature as shown in Table XIV, replicated for Examples 37 and 38. The tantalum nitride has an average particle size of about 1 micrometer. The density, Hardness, Rockwell A and Vickers hardness are also shown in Table XIV.

TABLE XIV

| Physical Properties of Examples 37-38 | | | | |
|---|---|---|---|---|
| Example No. | Preheat Temperature (°C.) | Density (g/cc) | Density % Theoretical | Hardness Rockwell A | Vickers Hardness (kg/mm$^2$) |
| 37 | 1650 | 15.70 | 100 | 95.1 | 2425 |
| 38 | 1800 | 15.74 | 100.3 | 94.6 | 2270 |

Similar results are expected with titanium nitride and tantalum nitride contents ranging from 1 to 50 percent, preheat temperatures of 1400° C. to 2000° C. and variations in time at pressure as well as pressure level. Similar results are also expected with other combinations of materials such as hafnium carbide with titanium nitride, zirconium nitride or tantalum nitride and tungsten carbide with zirconium nitride.

Example 39—Preparation of Densified Material Using Tungsten Carbide as AX, Dimolybdenum Carbide as the Source of B and Trichromium Dicarbide as the Source of C The process of Example 33 is duplicated, save for lowering the preheat temperature to that of Example 1 for a powdered admixture containing 94.7 percent of the same tungsten carbide as in Example 1, 3.1 percent of the same Mo$_2$C as in Example 8 and 2.2 percent of the same $Cr_3C_2$ as in Example 23. Physical properties of recovered parts are shown in Table XV.

Examples 40–41—Preparation of Densified Material Using Tungsten Carbide as AX, Titanium Carbide as a Source of B and Tantalum Carbide as a Source of C.

The process of Example 39 is replicated, save for using the same attritor as in Example 23, varying the preheat temperature as shown in Table XV, for a powdered admixture containing 93.6 percent of the same tungsten carbide as in Example 1, 1.6 percent of the same titanium carbide as in Example 27 and 4.8 percent of a 2 micron average particle size tantalum carbide. Physical properties recovered parts are shown in Table XV

TABLE XV

Physical Properties of Examples 39–41 and Comparative Example T

| Example No. | Preheat Temperature °C. | Density % Theoretical | Hardness Rockwell A | Vickers Hardness (kg/mm$^2$) | Palmqvist Toughness (kg/mm$^2$) |
|---|---|---|---|---|---|
| 39 | 1400 | 96.3 | 95.3 | 2420 | 22.6 |
| 40 | 1650 | 97.7 | 95.5 | 2494 | 22.4 |
| 41 | 1800 | 97.7 | 94.5 | 2243 | — |

— not measured

The data presented in Table XV support several observations. First, the preheat temperatures needed to attain high density varies with the composition as shown in Examples 39 and 40. Second, an increase in preheat temperature may not provide any substantial gain in physical properties. See Examples 40 and 41. Similar results are expected with other combinations of A, B, C and X, all of which are disclosed herein. The addition of one or other materials from the list common to A, B and C should also produce acceptable results. The densified materials, like others disclosed herein, are expected to provide satisfactory results in a variety of high-wear applications such as nozzles, metal-forming dies and cutting tools.

Examples 23, 42–44 and Comparative Example T—Preparation of Densified Material Using Tungsten Carbide as AX, $Cr_3C_2$ as the Source of B and Cobalt or Nickel as E The process of Example 33 is replicated save for using the smaller attritor first described in Comparative Example S, modifying the attritor mixing schedule by adding E halfway through the schedule and varying the preheat temperature for a variety of compositions, all of which are shown in Table XVI together with relevant physical properties. Example 23 in included for contrast with Comparative Example T.

preheat temperature can be lowered significantly without appreciable, if any, loss of physical properties. Similar results are expected with other variations of A, B, E and X, all of which are disclosed herein.

The materials of the present invention are, as noted hereinabove, useful in a wide variety of end use applications where wear resistance or hardness or both are needed. The materials are particularly useful in nozzles, such as sand blast nozzles and waterjet cutting nozzles, wear guides, bushings, powder compacting dies, valve parts, router bits, cutting tools, end mills, indexable inserts, wire drawing die parts and the like.

What is claimed is:

1. A material suitable for use in fabricating articles of manufacture requiring high degrees of hardness or wear resistance, the material consisting essentially of a substantially fully dense, complex, multi-phase, fine grained product of an incomplete reaction between AX and a source of B, wherein the source of B is a compound BY, the compound BY being present in an amount of from 1 to about 50 percent by weight based upon total weight of AX and BY, the reaction taking place under pressure and at an elevated temperature, said product consisting essentially of at least one compound AX and at least one product of varying stoichiometry, wherein A and B are different materials selected from the group consisting of titanium, zirconium, hafnium, vanadium, niobium, tantalum, chromium, molybdenum and tungsten, X is carbon, Y is boron, silicon or nitrogen, and the product of varying stoichiometry is at least one of a group consisting of (A, B)XY, (A, B)X and (A, B)Y.

2. The material of claim 1 wherein A is tungsten, titanium or hafnium, B is titanium, zirconium, hafnium or tantalum.

3. The material of claim 2 wherein A is tungsten and B is titanium.

4. The material of claim 3 having a hardness at 1200° C. of greater than about 5 gigapascals.

5. A material comprising a substantially fully dense, complex, multi-phase, fine grained product of an incomplete reaction between AX, a source of B, a densification promoting amount of E, and, optionally, an amount of X, the reaction taking place under pressure and at an elevated temperature, said reaction product consisting essentially of at least one compound AX and at least one compound (A, B, E)X, a product of varying stoichiometry, wherein A and B are different materials selected from the group consisting of titanium, zirconium, hafnium, vanadium, niobium, tantalum, chromium, molybdenum and tungsten, E being an element selected from the group consisting of iron, cobalt and nickel, and is carbon.

TABLE XVI

Composition/Physical Properties for Examples 42–44 and Comparative Examples T–U

| Example No. | Composition (% WC/% Cr3C2/% E) | E | Preheat Temp. °C. | Density % Theoretical | Hardness Rockwell A | Vickers Hardness (kg/mm$^2$)* | Pdmqvist Toughness (kg/mm) |
|---|---|---|---|---|---|---|---|
| 42 | 94.9/4.5/0.6 | Ni | 1275 | 96.7 | 95.4 | 2461 | 23.3 |
| 43 | 95.2/4.5/0.3 | Co | 1400 | 96.4 | 95.5 | 2464 | 23.5 |
| 44 | 93.6/4.4/2.0 | Co | 1400 | 98.5 | 95.1 | 2314 | 25.7 |
| 23 | 95.5/4.5 | — | 1500 | 97.2 | 95.4 | 2428 | 21.2 |
| 7 | 95.5/4.5 | — | 1400 | 89.2 | 92.2 | — | — |

— not measured
*measured using a thirty pound (13.6 kg) load

The data presented in Table XVI substantiate the utility of adding an amount of an iron group metal. The 6. The material of claim 5 wherein A is tungsten and B is selected from the group consisting of chromium and molybdenum.

7. The material of claim 6 wherein the source of B is trichromium dicarbide ($Cr_3C_2$).

8. The material of claim 6 having a Vickers hardness of at least about 2000 kg/mm$^2$ measured using a 1 kg load, and having an abrasion wear resistance of at least about 400 cm$^{-3}$ measured by the ASTM G65 method.

9. The material of claim 5 wherein E is cobalt.

10. The material of claim 5 wherein the amount of E is from about 0.3 to about 2.0% by weight, based upon the combined weight of A, and X.

11. A material suitable for use i fabricating articles of manufacture requiring high degrees of hardness or wear resistance, the material consisting essentially of a substantially fully dense, complex, multi-phase, fine grained product of an incomplete reaction between Ax and an source of B, the reaction taking place under pressure and at an elevated temperature, said product consisting essentially of at least one compound Ax and at least one compound (A, B)X, a product of varying stoichiometry, wherein A and B ar different materials selected from the group consisting of titanium, ziconium, hafnium, vanadium, niobium, tantalum, chromium, molybdenum and tungsten and X is nitrogen wherein the source of B is a compound with silicon or nitrogen.

12. The material of claim 11 wherein A is selected from the group consisting of tungsten, hafnium or titanium and B is a material different from A selected from the group consisting of tungsten, zirconium, vanadium, chromium and molybdenum.

13. The material of claim 12 having a grain size of less than about five microns.

14. The material of claim 11 further comprising a residual amount of the source of B.

15. The material of claim 11 having a density of more than about ninety percent of theoretical density.

16. A material suitable for use in fabricating articles of manufacture requiring high degrees of hardness or wear resistance, the material consisting essentially of a substantially fully dense, complex, multi-phase, fine grained product of an incomplete reaction between AX and a source of B, the reaction taking place under pressure and at an elevated temperature, said product consisting essentially of at least one compound AX and at least one compound (A,B)X, a product of varying stoichiometry, wherein A and B are different materials selected from the group consisting of titanium, zirconium, hafnium, vanadium, niobium, tantalum, chromium, molybdenum and tungsten and X is boron wherein the source of B is a compound with silicon or nitrogen.

17. A material suitable for use in fabricating articles of manufacture requiring high degrees of hardness or wear resistance, the material consisting essentially of a substantially fully dense, complex, multi-phase, fine grained product of an incomplete reaction between AX and a source of B, the reaction taking place under pressure and at an elevated temperature, said product consisting essentially of at least one compound AX and at least one compound (A,B)X, a product of varying stoichiometry, wherein A and B are different materials selected form the group consisting of titanium, zirconium, hafnium, vanadium, niobium, tantalum, chromium, molybdenum and tungsten and X is silicon wherein the source of B is a compound with silicon, boron or nitrogen.

18. A material suitable for use in fabricating articles of manufacture requiring high degrees of hardness or wear resistance, the material consisting essentially of a substantially fully dense, complex, multi-phase, fine grained product of an incomplete reaction between AX and a source of B, wherein the source of B is a compound BY, the reaction taking place under pressure and at an elevated temperature, said product consisting essentially of at least one compound AX and at least one product of varying stoichiometry wherein A and B are different materials selected from the group consisting of titanium, zirconium, hafnium, vanadium, niobium, tantalum, chromium, molybdenum and tungsten, X is boron, Y is silicon or nitrogen, and the product of varying stoichiometry is at least one of a group consisting of (A, B)XY, (A, B)X and (A, B)Y.

19. A material suitable for use in fabricating articles of manufacture requiring high degrees of hardness or wear resistance, the material consisting essentially of a substantially fully dense, complex, multi-phase, fine grained product of an incomplete reaction between AX and a source of B, wherein the source of B is a compound BY, the reaction taking place under pressure and at an elevated temperature, said product consisting essentially of at least one compound AX and at least one product of varying stoichiometry, wherein A and B are different materials selected from the group consisting of titanium, zirconium, hafnium, vanadium, niobium, tantalum, chromium, molybdenum and tungsten, X is silicon, Y is boron, or nitrogen, and the product of varying stoichiometry is at least one of a group consisting of (A, B)XY, (A, B)X and (A, B)Y.

20. A material suitable for use in fabricating articles of manufacture requiring high degrees of hardness or wear resistance, the material consisting essentially of a substantially fully dense, complex, multi-phase, fine grained product of an incomplete reaction between AX and a source of B, wherein the source of B is a compound BY, the reaction taking place under pressure and at an elevated temperature, said product consisting essentially of at least one compound AX and at least one product of varying stoichiometry, wherein A and B are different materials selected from the group consisting of titanium, zirconium, hafnium, vanadium, niobium, tantalum, chromium, molybdenum and tungsten, X is nitrogen, Y is boron, or silicon, and the product of varying stoichiometry is at least one of a group consisting of (A, B)XY, (A, B)X and (A, B)Y.

21. A material comprising a substantially fully dense, complex, multi-phase, fine grained product of an incomplete reaction between AX, a source of B, a densification promoting amount of E, and, optionally, an amount of X, the reaction taking place under pressure and at an elevated temperature, said reaction product consisting essentially of at least one compound AX and at least one compound (A, B, E)X, a product of varying stoichiometry, wherein A and B are different materials selected from the group consisting of titanium, zirconium, hafnium, vanadium, niobium, tantalum, chromium, molybdenum and tungsten, E being an element selected from the group consisting of iron, cobalt and nickel, and X is boron wherein the source of B is a compound with carbon, silicon or nitrogen.

22. A material comprising a substantially fully dense, complex, multi-phase, fine grained product of an incomplete reaction between AX, a source of B, a densification promoting amount of E, and, optionally, an amount of X, the reaction taking place under pressure and at an elevated temperature, said reaction product consisting essentially of at least one compound AX and at least one compound (A, B, E)X, a product of varying stoichiometry, wherein A and B are different materials selected from the group consisting of titanium, zirconium, hafnium, vanadium, niobium, tantalum, chromium, molybdenum and tungsten, E being an element selected from the group consisting of iron, cobalt and nickel, and X is silicon.

23. A material comprising a substantially fully dense, complex, multi-phase, fine grained product of an incomplete reaction between AX, a source of B, a densification promoting amount of E, and, optionally, an amount of X, the reaction taking place under pressure and at an elevated temperature, said reaction product consisting essentially of at least one compound Ax and at least one compound (A, B, E)X, a product of varying stoichiometry, wherein A and B are different materials selected from the group consisting of titanium, zirconium, hafnium, vanadium, niobium, tantalum, chromium, molybdenum and tungsten, E being an element selected from the group consisting of iron, cobalt and nickel, and X is nitrogen.

* * * * *